3,096,265
PROCESS FOR THE PREPARATION OF KETONIC ORGANIC COMPOUNDS AND PRODUCTS RESULTING THEREFROM
Karl W. Hubel and Emile Henri Braye, Brussels, Belgium, assignors to Union Carbide Corporation, a corporation of New York
No Drawing. Filed Mar. 31, 1960, Ser. No. 18,889
Claims priority, application Great Britain Apr. 7, 1959
10 Claims. (Cl. 204—158)

This invention relates to the preparation of organic compounds and to products resulting therefrom. More particularly, it relates to a process for the preparation of linear or cyclic ketonic compounds such as enediones and anhrydrides.

The present invention greatly facilitates the synthesis of substituted or unsubstituted organic compounds in that it provides a new and general one-step method for this purpose. The invention is predicated upon the discovery that when certain organo-metallic complexes, as hereinafter described, whose organic part contains a preformed carbon skeleton, are reacted with compounds containing at least one element or reactant capable of forming stable bonds with the skeleton, the bonding of the element to the skeleton is readily achieved. The compounds formed thereby are characterized as containing at least one of the carbon skeletons and at least one of the elements.

Although the mechanism of the reaction is not fully understood, basic considerations applying to the inventive process can be found in the following discussion. It is believed that organo-metallic complexes as for example, $Fe_2(CO)_6(RC_2R)_2$ or $Fe_2(CO)_7(RC_2R)_2$ can be represented by the structures respectively shown below, wherein the actual meaning of R has been disregarded for the sake of clarity.

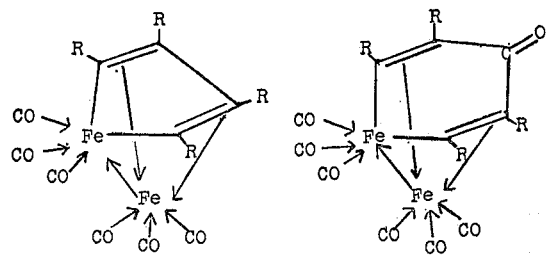

There are various evidences which indicate that the two iron atoms contained in these organo-metallic complexes have different chemical behavior. In particular it has been found that the iron atom bonded into the ring system can be more readily removed than the other iron atom. It can thus be foreseen that the splitting of the iron atoms which occurs during the reaction isolates a highly reactive carbon skeleton which can readily react with any element capable of forming stable bonding with that carbon skeleton. Similar considerations apply to the various organo-metallic complexes containing only one metal atom or one (R'C₂R'') group and apply as well to the complexes having a larger number of metal atoms or (R'C₂R'') groups in their structure. It is therefore apparent that by properly selecting the reactant containing an element capable of forming stable bondings with the carbon skeleton, a large variety of organic compounds can be provided.

According to this invention, a process for the preparation of linear or cyclic pleuri-ketonic compounds comprises reacting an organo-metallic compound having the formula: $M_x(CO)_y(R'C_2R'')_z(B)_w$ with an oxidation reagent. In the above referred to organo-metallic complexes, M represents a transition metal belonging to the VI, VII or VIII sub groups of the periodic table, CO represents a carbonyl group, R' and/or R'' may be the same or different and represent hydrogen, halogeno, carboalkoxy, alkyl, aryl, cycloaliphatic, alkoxy or silyl groups and the like, including the substituted derivatives thereof, $C_2$ represents a carbon-to-carbon bonding, B represents a member selected from the group consisting of hydrogen, mercury, halogen, alkyl, aryl or acyl, $x$ represents an integer of from 1 to 4, $y$ represents an integer of from 1 to 10, $z$ represents an integer of from 1 to 6, and $w$ represents an integer of from 0 to 4.

Typical organo-metallic complexes suitable for use in the process of this invention include:

$Fe_2(CO)_6(RC_2R')_2$, wherein R represents a phenyl or ethyl group or a hydrogen atom and wherein R' represents a phenyl, methyl, ethyl or methoxy group or a hydrogen atom.

$Fe_2(CO)_8(RC_2R')_2(B)_2$ wherein R and R'' represent hydrogen and B represents either hydrogen or a methyl rest. These complexes may be represented by the following structure:

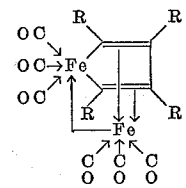

$Fe_2(CO)_7(RC_2R')_2$, wherein R and R' represent phenyl groups. This complex may be represented by the following structure:

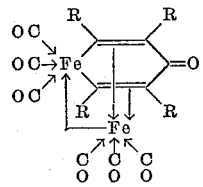

$Fe_2(CO)_6(RC_2R')$, wherein R and R' represent phenyl groups. This complex may be represented by the following structure:

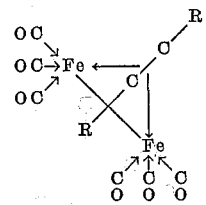

$Fe(CO)_4(RC_2R')_2$, wherein R represents a phenyl group and wherein R' represents a phenyl group or a hydrogen atom. This complex may be represented by the following structure:

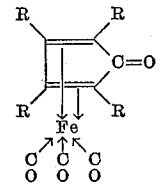

$Fe(CO)_6(RC_2R')$, wherein R represents a hydrogen atom or a phenyl group and wherein R' represents a hydrogen atom. This complex may be represented by the following structure:

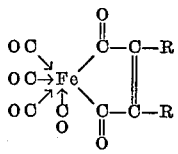

Fe$_3$(CO)$_8$(RC$_2$R')$_2$, wherein R and R' represent phenyl groups. This complex may be represented by the following structure:

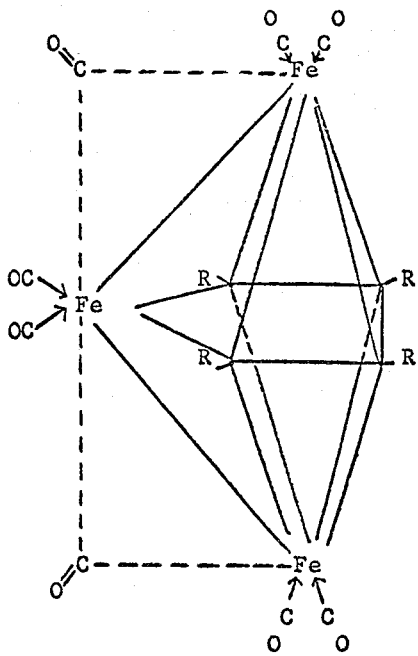

Fe$_2$(CO)$_6$(RC$_2$H)$_3$, wherein R represents a phenyl group. This complex may be represented by the following structure:

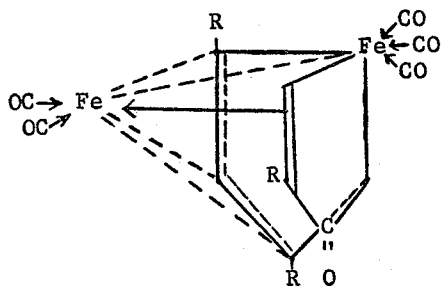

Fe(CO)$_4$(RC$_2$H)$_3$, wherein R represents a phenyl group or a hydrogen atom. This complex may be represented by the following structure:

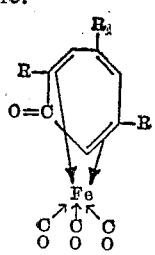

Co$_2$(CO)$_6$(RC$_2$R'), wherein R represents a phenyl group and R' represents a phenyl group or a carbomethoxy group. This complex may be represented by the following structure:

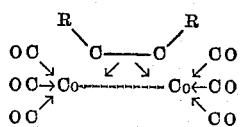

Co$_2$(CO)$_4$(RC$_2$R')$_3$, wherein R represents a carboethoxy or methyl group or a hydrogen atom and wherein R' represents a phenyl group or a trimethylsilyl group. This complex may be represented by the following structure:

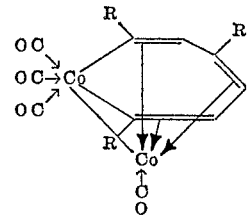

Co$_2$(CO)$_6$(RC$_2$H)$_4$Hg, wherein R represents a tertiary butyl or trimethylsilyl group. This complex may be represented by the following structure:

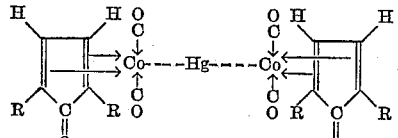

Co$_2$(CO)$_6$(RC$_2$H)$_4$, wherein R represents a tertiary butyl or trimethylsilyl group. This complex may be represented by the following structure:

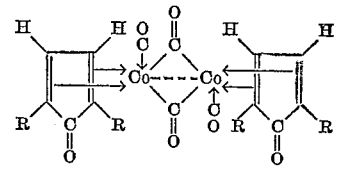

Co$_3$(CO)$_9$H(RC$_2$H), wherein R represents a phenyl group. This complex may be represented by the following structure:

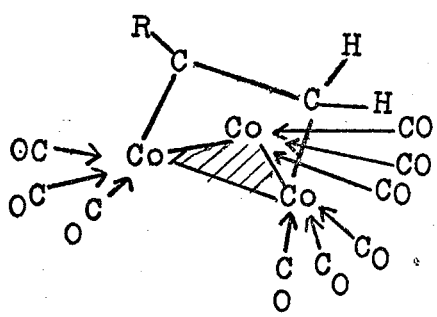

Ni(CO)$_2$(RC$_2$R')$_4$, wherein R and R' represent phenyl groups. This complex may be represented by the following structure:

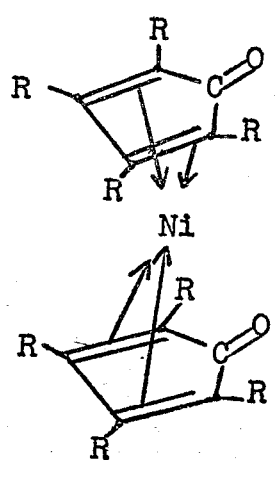

and,

Mo$_2$(CO)$_4$(φC$_2$φ)$_5$

Other useful organo-metallic complexes are those in which the transition metal is ruthenium, rhodium, palladium, osmium, iridium, platinum, manganese, rhenium, chromium or tungsten, or are those in which the carbonyl group bonded to the metal is partially replaced by a nitrosyl, a substituted stibine, a substituted arisine, or a substituted phosphone.

The organo-metallic complexes employed as starting materials in the present invention may be conveniently prepared by the process described in copending application 707,111, entitled, "Organo-Metallic Compounds and Method for Their Preparation," filed January 6, 1958, in the name of Karl Walter Hubel, the description thereof being incorporated herein by reference.

Briefly stated, the organo-metallic complexes can be prepared by reacting an acetylenic compound with a metal carbonyl in a non-aqueous neutral medium at a temperature of between room and 300° C. As a consequence, a stable organo-metallic carbonyl reaction product is formed. The acetylenic reactant has the formula:

$$R'C \equiv CR''$$

wherein R' and R" represent a substituent selected from the group consisting of hydrogen, an organic group, and substituted derivatives thereof, a functional group and substituted derivatives thereof and an organo-substituted hydride group, the substituent being substantially inert to and inactive with the carbonyl group. The metals of the metal carbonyl group are selected from the group consisting of iron, nickel, ruthenium, rhodium, palladium, osmium, iridium, platinum, manganese, rhenium, chromium, molybdenum, cobalt and tungsten.

For the process of this invention any oxidation reagent may be employed as a reactant with the organo-metallic complex. Thus, atmospheric oxygen, halogens, tin tetrachloride, ferric chloride, $SO_2Cl_2$, $Cl_2O$, nitrobenzene, dichloroamine-T, hydrogen peroxide, permanganates, chromates, bichromates, ferricyanates, hypochlorides, hypobromides, iodates, periodates, and per-acids may be employed. However, it is preferable to employ a member selected from the group consisting of gaseous oxygen, either alone or in the presence of other compounds, $SO_2Cl_2$, $Cl_2O$, $FeCl_3$, $SnCl_4$, nitrosobenzene, dichloroamine-T, and bromine.

The process of this invention can be carried out using stoichiometric amounts of the starting materials. However, it has been found that an excess of the aforesaid oxidation reactant is generally preferable. The reaction is usually carried out in a polar or non-polar organic solvent such as benzene, petroleum ether, ether, tetrahydrofuran, beta-ethoxy ethanol and the like. When side reactions are to be avoided, the selected solvent should preferably be of an inert kind. However, no addition of solvent is necessary when one of the starting materials is liquid at the reaction temperature.

The reaction is usually achieved by heating the reaction mixture, or by activating the reaction mixture with ultraviolet radiations, or by combining both heating and ultraviolet radiations. However, when employing reactants normally used at relatively low temperatures, it is advisable to cool the reaction mixture down to 0° C. or lower. Generally speaking, the reaction temperature at which the process of this invention may be carried out ranges from about −60° C. to about 250° C. The specific temperature employed will, of course, depend upon the nature of the reactants employed. It is preferable to perform the reaction in a closed system whenever one of the reactants, or the reaction products formed thereby or the solvent employed, are too volatile at the reaction temperatures.

The reaction is usually completed within a few hours, although longer reaction times may be necessary in some instances. The reaction products are easily removable from the reaction mixture after completion of the reaction using any suitable technique. The technique of removal will of course vary according to the nature of the reaction product and the occurrence of side reactions. Suitable process conditions will be further illustrated in the specific examples hereinafter described relating to the present invention.

The compounds prepared by the process of this invention may be illustrated by the following general formulae:

(A) 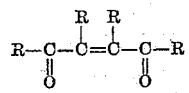

(B) 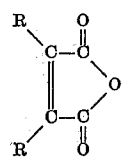

wherein R represents hydrogen or hydroxyl, halogeno, carboalkoxy, alkyl, aryl, cycloaliphatic, alkoxy, or silyl groups including the substituted derivatives thereof. These enedione and anhydride compounds are by way of illustration only. Many other representative pleuriketonic compounds, linear and cyclic can be produced by the process of this invention. Generally speaking, however, the oxidized compounds formed by the process of this invention will contain at least one $(R'C_2R'')$ unit wherein R' and R" have the meanings previously defined.

The invention may be further illustrated by the following examples.

EXAMPLE I 1 gram of $Fe_2(CO)_6(C_6H_5C_2C_6H_5)_2$, finely pulverized, was added in small portions to 20 ml. of refluxing $SO_2Cl_2$. The excess of sulfuryl chloride was distilled off and the residue yielded 0.15 gram (25%) of cis-dibenzoyl-stilbene (M.P. 208° C.). This substance can easily be isomerized into the trans-form (M.P. 231° C.) by recrystallization.

The same reaction product was also obtained with $Cl_2O$ as an oxidation reagent. Similarly the same reaction can also be performed by using atmospheric oxygen and by irradiating the reaction mixture with ultra-violet light.

EXAMPLE II 1.6 grams of $Fe_2(CO)_7(C_6H_5C_2C_6H_5)_2$ and 2 grams of nitrosobenzene were dissolved in 150 ml. benzene in a quartz vessel and the solution was irradiated with ultraviolet light (125 W high pressure Hg-lamp) for about 6 hours. The reaction mixture was passed over a chromatographic column and yielded: —0.09 gram of tetraphenyl-γ-pyrone, M.P. 285–290° C., whoe structure was proven by its I.R. spectrum and analysis.

Analysis

|   | Found | Theoretical Calculated for $C_{29}H_{20}O_2$ |
|---|---|---|
| C | 86.13 | 86.98 |
| H | 4.79 | 5.03 |
| O | 8.18 | 7.99 | and 0.1 gram of a product melting at 195–7° C. and crystallizing from ethanol in colorless needles. Analysis showed that this compound corresponded to $$(C_6H_5C_2C_6H_5)_2(CO)O_2$$

this product appeared to be the oxidation product of the organic part of the initial complex.

Analysis

|   | Found | Theoretical Calculated for C29H20O3 |
|---|---|---|
| C | 83.24 | 83.62 |
| H | 4.63 | 4.84 |

Apart from those products, small amounts of tetracyclone and tetraphenyl-p-quinone were found which are formed by side reactions.

EXAMPLE III

To a solution of 1 gram (0.84 mM.) (millimoles) $Mo_2(CO)_4(C_6H_5C_2C_6H_5)_5$ in 100 ml. $CCl_4$ there was added dropwise at room temperature, 40 ml. of a 0.5 molar bromine solution in $CCl_4$. After 2 hours, the solution was evaporated, the residue was dissolved in benzene and water is added. From the organic layer there was separated by chromatography, 0.2 gram (0.59 mM) trans-$\alpha,\beta$-dibromostilbene (M.P. 210° C.) and 0.3 gram trans-$\alpha,\beta$-dibenzoyl-stilbene. As a side product, 0.12 gram tetraphenyl-cyclopentadienone was also obtained.

EXAMPLE IV 6 grams (16.5 mM.) $Fe_2(CO)_6(HC_2OCH_3)_2$ was dissolved in 100 ml. $CH_2Cl_2$, and 13 grams (54.5 mM.) N,N-di-chloro-p-toluene-sulfonamide was added in small portions at room temperature. A vigorous reaction resulted with evolution of carbon monoxide. The reaction mixture was filtered the next day, washed first with 2NHCl. Toluene sulfonamide was extracted with 2 N $Na_2CO_3$. The organic layer was then evaporated to dryness and the products dissolved in $C_6H_6$ were separated by chromatography on silicagel. The ether fraction yielded 0.2 gram of a colorless compound which after recrystallization was found to melt at 220–221° C. The I.R. spectrum and the analysis showed it to be 1,4-bis(p.toluene-sulfonimino-) 1,4-dimethoxy-butane.

Analysis

|   | Found | Theoretical Calculated for C20H22O6N2S2 |
|---|---|---|
| C | 53.47 | 53.32 |
| H | 5.02 | 4.93 |
| S | 13.89–14.6 | 14.24 |

From the filtrate of the ether fraction dimethyl fumarate, M.P. =103–5° C., was also isolated as a result of the oxidation of the organic ligand.

EXAMPLE V

To a solution of 0.7 gram (2.15 mM.)

in 30 ml. dioxane, a solution of 4.1 grams (15 mM.) $FeCl_3.6H_2O$ was added and the mixture refluxed for 20 minutes. After cooling, one added 2 N NaOH (25 ml.); the iron hydroxide was filtered off, the filtrate evaporated and the residue consisting of sodium phenylmaleate, dissolved in 10 ml. $H_2O$. To the faintly acid aqueous solution, 1.6 gram $[C_6H_5CH_2SC(NH_2)_2]^+.Cl^-$, dissolved in 10 ml. $H_2O$, was added. The precipitate, recrystallized from water/alcohol (I/I), yield 0.5 gram (44.5%) of di[S-benzyliso-thiuronium]phenylmaleate, M.P.:182–184° C. (decomp.)

Analysis

|   | Found | Theoretical calculated for C26H28N4O4S2 |
|---|---|---|
| C | 59.66 | 59.52 |
| H | 5.15 | 5.38 |
| N | 10.33 | 10.68 |
| O | 12.46 | 12.20 |

The corresponding anhydride (phenylmaleic anhydride) may be obtained by working up in another way. The free acid was liberated from its sodium salt by acidifying with HCl. The acid was sublimed at 120° C. under vacuum and the anhydride, M.P. 119–121.5° C., was obtained with the same yield.

Analysis

|   | Found | Theoretical calculated for C10H6O3 |
|---|---|---|
| C | 68.92 | 68.96 |
| H | 3.27 | 3.48 |
| O | 27.70 | 27.56 |

The compounds produced by the process of this invention have art-recognized utility or will serve as intermediates in the production of compounds having a wide range of art-recognized utility.

For example, the di-ketonic compounds produced by this invention are useful in the preparation of chelating agents of the type used in analytical chemistry and of the type useful in forming soluble complex metal isomers. The dienophile or anhydride compositions are useful in the production of alicyclic derivatives and also as reactants in Diels-Alder reactions. They are also useful as monomers for copolymerization with polyols, polycarboxylic acids and amines to produce useful copolymers.

What is claimed is:

1. A process for the preparation of ketonic organic compounds free of carbon to metal bonds, which comprises reacting an organometallic complex having the formula:

$$M_x(CO)_y(R'C_2R'')_z(B)_w$$

wherein M is a transition metal selected from the group consisting of sub-groups VIB, VIIB and VIII of the periodic table, CO represents a carbonyl group, R' and R'' represent a member selected from the group consisting of hydrogen, halogeno, carboalkoxy, alkyl, aryl, cycloaliphatic, alkoxy and silyl groups, $C_2$ represents carbon-to-carbon bonding, B represents a member selected from the group consisting of hydrogen, mercury, halogen, alkyl, aryl and acyl, $x$ represents an integer of from 1 to 4, $y$ represents an integer of from 1 to 10, $z$ represents an integer of from 1 to 6, and $w$ represents an integer of from 0 to 4, with at least a stoichiometric amount of an oxidation regent, whereby the carbon to metal bond in said complex is broken and oxygen is added to the $C_2$ group present in said complex to form the said ketonic organic compounds.

2. A process as claimed in claim 1, in which the metal of the organo-metallic complex is iron.

3. A process as claimed in claim 1, in which the metal of the organo-metallic complex is cobalt.

4. A process as claimed in claim 1, in which the metal of the organo-metallic complex is nickel.

5. A process as claimed in claim 1, in which the metal of the organo-metallic complex is molybdenum.

6. A process as claimed in claim 1, in which the oxidation reagent is a member selected from the group consisting of oxygen, $SO_2Cl_2$, $Cl_2O$, ferric chloride, tin tetrachloride, nitrosobenzene, dichloroamine-T and bromine.

7. A process as claimed in claim 1, in which a stoichiometric excess of the oxidation reagent is employed.

8. A process as claimed in claim 7, in which an organic solvent selected from the group consisting of benzene, petroleum ether, ether, tetrahydrofuran, and beta-ethoxy ethanol is employed.

9. A process as claimed in claim 8, in which the reaction is carried out at a temperature of between −60° C. and 250° C.

10. A process as claimed in claim 1, in which the reaction mixture is initially activated by ultraviolet radiation.

References Cited in the file of this patent

UNITED STATES PATENTS

| | | |
|---|---|---|
| 2,849,470 | Benson | Aug. 26, 1958 |
| 2,849,471 | Thomas | Aug. 26, 1958 |
| 2,852,542 | Sweeney | Sept. 16, 1958 |
| 2,898,359 | Leedham et al. | Aug. 4, 1959 |
| 2,916,503 | Kozikowski | Dec. 8, 1959 |